(12) United States Patent
Allen et al.

(10) Patent No.: US 10,344,785 B1
(45) Date of Patent: Jul. 9, 2019

(54) MULTIPLE COMPONENT FAIRING

(71) Applicant: VIV Solutions LLC, Richmond, TX (US)

(72) Inventors: Donald Wayne Allen, Richmond, TX (US); Jeffrey Robert Dupuis, Houston, TX (US); Julie Ann Dehne, Cypress, TX (US)

(73) Assignee: VIV SOLUTIONS LLC, Richmond, TX (US)

( * ) Notice: Subject to any disclaimer, the term of this patent is extended or adjusted under 35 U.S.C. 154(b) by 0 days.

(21) Appl. No.: 15/861,360

(22) Filed: Jan. 3, 2018

Related U.S. Application Data

(60) Provisional application No. 62/441,741, filed on Jan. 3, 2017, provisional application No. 62/596,114, filed on Dec. 8, 2017.

(51) Int. Cl.
| | | |
|---|---|---|
| *F15D 1/10* | (2006.01) | |
| *F15D 1/00* | (2006.01) | |
| *E21B 17/01* | (2006.01) | |
| *F16L 1/12* | (2006.01) | |
| *F15D 1/12* | (2006.01) | |

(Continued)

(52) U.S. Cl.
CPC .............. *F15D 1/003* (2013.01); *E21B 17/01* (2013.01); *F15D 1/12* (2013.01); *F16L 1/123* (2013.01); *B63B 21/502* (2013.01); *B63B 21/663* (2013.01); *B63B 2021/504* (2013.01)

(58) Field of Classification Search
CPC ... B63B 21/663; B63B 2021/504; F16L 1/123
See application file for complete search history.

(56) References Cited

U.S. PATENT DOCUMENTS

| | | |
|---|---|---|
| 1,104,254 A | 7/1914 | Eddelbuttel-Reimers |
| 3,194,204 A | 7/1965 | Nichols et al. |
| 3,899,991 A | 8/1975 | Chatten et al. |

(Continued)

FOREIGN PATENT DOCUMENTS

| | | |
|---|---|---|
| EP | 0096956 | 12/1983 |
| GB | 108761 A | 8/1917 |

(Continued)

OTHER PUBLICATIONS

Non-Final Office Action dated Sep. 29, 2016, U.S. Appl. No. 15/171,823.

(Continued)

*Primary Examiner* — Sean D Andrish
(74) *Attorney, Agent, or Firm* — Womble Bond Dickinson (US) LLP

(57) ABSTRACT

A fairing for suppressing a vortex induced vibration (VIV) of a tubular including an encircling member dimensioned to encircle a tubular, the encircling member having a first side that extends toward a second side when the encircling member is positioned around a tubular. The fairing further including a support member positioned between the first side and the second side, the support member having a channel formed therein, and an opening to the channel is positioned between the first side and the second side. In addition, the fairing includes a tail member positioned within the channel, the tail member having a substantially planar surface that extends radially outward from the channel.

14 Claims, 13 Drawing Sheets

(51) Int. Cl.
*B63B 21/50* (2006.01)
*B63B 21/66* (2006.01)

(56) References Cited

U.S. PATENT DOCUMENTS

| | | | |
|---|---|---|---|
| 4,075,967 A | | 2/1978 | Silvey |
| 4,200,999 A | | 5/1980 | Latimer |
| 4,398,487 A | | 8/1983 | Ortloff et al. |
| 4,567,841 A | * | 2/1986 | Hale .................... B63B 21/663 |
| | | | 114/221 R |
| 5,410,979 A | | 5/1995 | Allen et al. |
| 5,738,034 A | | 4/1998 | Wolff et al. |
| 5,984,584 A | | 11/1999 | McMillan et al. |
| 6,010,278 A | | 1/2000 | Denison et al. |
| 6,048,136 A | | 4/2000 | Denison et al. |
| 6,067,922 A | | 5/2000 | Denison et al. |
| 6,179,524 B1 | | 1/2001 | Allen |
| 6,223,672 B1 | | 5/2001 | Allen et al. |
| 6,244,204 B1 | | 6/2001 | Weyman |
| 6,896,447 B1 | | 5/2005 | Taquino |
| 7,337,742 B1 | | 3/2008 | Masters et al. |
| 7,467,913 B1 | | 12/2008 | Allen et al. |
| 7,513,209 B2 | | 4/2009 | Masters et al. |
| 7,934,888 B2 | | 5/2011 | Masters et al. |
| 8,523,492 B2 | | 9/2013 | Baugh |
| 9,080,610 B1 | * | 7/2015 | West .................... E02D 5/60 |
| 9,534,618 B1 | | 1/2017 | Allen et al. |
| 9,677,688 B1 | | 6/2017 | Allen et al. |
| 2002/0134553 A1 | | 9/2002 | Woodrow |
| 2004/0175240 A1 | | 9/2004 | McMillan et al. |
| 2005/0254903 A1 | | 11/2005 | McMillan et al. |
| 2006/0021560 A1 | | 2/2006 | McMillan et al. |
| 2007/0104542 A1 | | 5/2007 | Somerville et al. |
| 2007/0215028 A1 | | 9/2007 | Lie |
| 2008/0025800 A1 | | 1/2008 | Watkins |
| 2008/0056828 A1 | * | 3/2008 | Allen .................... F15D 1/10 |
| | | | 405/211 |
| 2013/0039702 A1 | | 2/2013 | West et al. |

FOREIGN PATENT DOCUMENTS

| | | |
|---|---|---|
| WO | WO-2014166543 | 10/2014 |
| WO | WO-2016080828 | 5/2016 |

OTHER PUBLICATIONS

Allen, et al., "Comparisons of Various Fairing Geometries for Vortex Suppression at High Reynolds Numbers", OTC 19377, 2008 Offshore Technology Conference, Houston, Texas, May 5-8, 2008, 16 pages.

* cited by examiner

US 10,344,785 B1

MULTIPLE COMPONENT FAIRING

CROSS-REFERENCE TO RELATED APPLICATION

The application is a non-provisional application of U.S. Provisional Patent Application No. 62/441,741, filed Jan. 3, 2017, and U.S. Provisional Patent Application No. 62/596,114, filed Dec. 8, 2017, both of which are incorporated herein by reference.

FIELD

A fairing for suppressing a vortex induced vibration (VIV) of a tubular, more specifically a multiple component fairing including the components of an encircling member, a tail member, and a support member that may each be separately formed pieces. Other embodiments are also described herein.

BACKGROUND

A difficult obstacle associated with the exploration and production of oil and gas is management of significant ocean currents. These currents can produce vortex-induced vibration (VIV) and/or large deflections of tubulars associated with drilling and production. VIV can cause substantial fatigue damage to the tubular or cause suspension of drilling due to increased deflections. Deflections of both production and drilling tubulars can be alleviated using various types of fairings.

Fairings streamline the flow and thereby reduce the intensity of vortex shedding. With weaker vortices, both VIV and drag or deflection of the underlying tubular can be decreased.

For drilling risers the suppression device of choice is usually a fairing. This is because fairings offer both reduced VIV as well as reduced drag (whereas helical strakes only reduce VIV and can increase drag). A popular choice for drilling risers is the use of tail fairings which consist of a fairing tail and two straps. The straps only cover a fraction of the tubular and thus much of the riser is left directly exposed to the ocean. A challenge associated with tail fairings is that many risers have mux lines, pod hoses, or other auxiliary lines that run the length of the riser and can be exposed when tail fairings are used. This exposure can actually cause tripping of the boundary layers thereby significantly reducing the effectiveness of the tail fairing. In addition, it can be important to protect the auxiliary lines so that the fairing tail does not impact the auxiliary lines and cause damage to them.

Normally, when external auxiliary lines are present, full fairings are used that completely shroud the riser and mux lines. The problem with most full fairings are that they are slow and cumbersome to install, unlike tail fairings which are very fast and efficient to install. Finally, it is also important to have a full fairing that can be built quickly and at reduced cost.

Fairings are normally constrained axially by collars. These collars are clamped tight around the tubular so that the fairings may be free to rotate with changes in current direction and restricted from sliding axially past the collar. Various arrangements of collars and fairings are possible.

An issue associated with fairings is that they typically are made of plastic which requires a mold to form fairings of the correct shape. This requires fabrication of the mold prior to commencement of fairing fabrication, which adds for time and cost. Molding of fairings also takes considerable time and there is a cost associated with molding.

In general, fairings are significantly more expensive to fabricate than helical strakes, thereby giving them a disadvantage in the marketplace. They also take up considerable space during transportation which adds to their cost. While helical strakes are often split into halves or even thirds to increase the quantity that will fit into a shipping container, fairings cannot be split into halves or thirds because of they are not banded onto the tubular like helical strakes and thus need their full circumference for structural integrity.

SUMMARY

The present invention is directed to a fairing having three or more parts. In some embodiments, the fairing, including one or more of the parts, may be formed without the need for a mold. For example, the parts may include a fairing nose, a body, a strap and/or a shroud, and construction of one or more of these parts may be performed without using heat or a mold. The fairing is therefore relatively fast and cheap to fabricate, and because it is multiple parts as opposed to a single unitary structure, it can be stored efficiently.

The present invention is further directed to a fairing system that is fast to install and can protect auxiliary lines that reside outside of the riser. The fairing system may include multiple parts, including a shroud that completely covers exposed portions of the tubular. The fairing may further be constructed to protect underlying auxiliary lines. The fairing is constructed so that it is relatively fast to install and build.

More specifically, in one embodiment, the invention is directed to a fairing for suppressing a vortex induced vibration (VIV) of a tubular, the fairing including an encircling member dimensioned to encircle a tubular, the encircling member having a first side that extends toward a second side when the encircling member is positioned around a tubular. The fairing further including a support member positioned between the first side and the second side, the support member having a channel formed therein, and an opening to the channel is positioned between the first side and the second side, and a tail member positioned within the channel, the tail member having a substantially planar surface that extends radially outward from the channel. In some embodiments, the entire tail member is planar. In still further embodiments, a first portion of the tail member is planar and a second portion of the tail member is out-of-plane with respect to the first portion. In some cases, a closed end of the channel is dimensioned to receive the second portion, and positioning of the second portion in the closed end holds the tail member in place. Said another way, the closed end of the channel is dimensioned to receive the second portion, and positioning of the second portion in the closed end restrains the tail member from one or more degrees of freedom, or one or more directions of movement. In other embodiments, the tail member is attached to the support member by a fastener extending entirely through the support member and the tail piece in a widthwise direction. Still further, the tail member may be attached to the first side and the second side of the encircling member by a fastener inserted through only the tail member and the first side and the second side of the encircling member. In some cases, the first side and the second side of the encircling member are curved inwardly toward the tail member. The support member may run substantially an entire height of the tail member. In some embodiments, the support member and the tail member may be molded together. In still further embodiments, the support member may be a fairing nose, and the fairing nose may be made up of a plurality of nose piece segments stacked one on top of the other, and which are secured together by the tail member extending between each of the nose pieces. The tail member may be made up of a plurality of tail piece segments stacked one on top of the other, and held together by the encircling member or the support member. In still further embodiments, the encircling member is a shroud having a top end and a bottom end, and the fairing further comprises a strap attached to the top end or the bottom end of the shroud, and an end of the strap is attached to the tail member to secure the shroud to the tail member. The fairing may further include a collar and an auxiliary line insert positioned between the collar and the tubular, the auxiliary line insert dimensioned to secure auxiliary lines between the collar and the tubular.

In other embodiments, the fairing for suppressing a vortex induced vibration (VIV) of a tubular may include a tail assembly dimensioned to suppress a vortex induced vibration of a tubular, the tail assembly having a support member that encircles less than an entire circumference of a tubular and has a channel formed therein, and a tail member having a first portion positioned within the channel and a second planar portion extending outward from the channel, and a fairing nose dimensioned to encircle a remaining circumference of the tubular and secure the tail assembly to the tubular. In some embodiments, the first portion of the tail member may include a cross-piece extending out of a plane of the second planar portion, and the cross-piece is positioned within a similarly shaped portion of the channel to hold the tail member within the channel. The fairing nose may include a sleeve having a first side and the second side, and the first side and the second side extend along the tail member and increase an overall thickness of the tail member. The fairing nose may include a sleeve that encircles the remaining circumference of the tubular, and a strap is attached to a top end or a bottom end of the sleeve and the tail assembly to secure the tail assembly to the tubular. The sleeve may be attached to the strap by a fastener. The tail assembly and the fairing nose may be separate pieces attached to one another by fasteners. The fairing nose is formed without heat.

The above summary does not include an exhaustive list of all aspects of the present invention. It is contemplated that the invention includes all apparatuses that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section, we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

Figure 1:
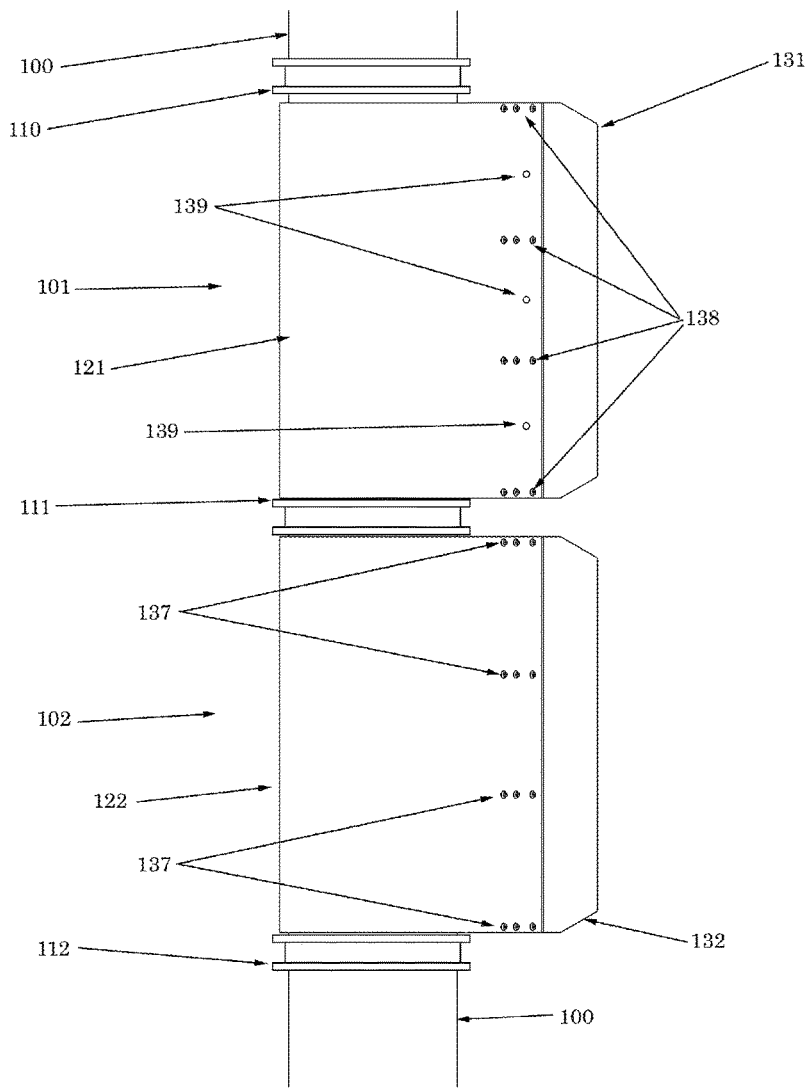
FIG. 1 is a side view of two fairings and three collars.

Referring now to the invention in more detail, FIG. 1 shows fairings 101 and 102, separated by collars 110, 111, and 112 on tubular 100. Fairing 101 includes a fairing nose 121, tail piece 131, block fasteners 138, and copper fasteners 139. Similarly, fairing 102 includes a fairing nose 122, tail piece 132, and block fasteners 137. Fairing nose 121 and 122 are dimensioned to encircle at least a portion of tubular 100. Tail piece 131 and 132 extend radially outward from ends of fairing nose 121 and 122, respectively, and are dimensioned to suppress VIV. Tail piece 131 and tail piece 132 may also be referred to herein as tail members, fins or flanges, or as included such structures.

Again referring to FIG. 1, collars 110, 111, and 112 are clamped tight against tubular 100 while fairings 101 and 102 are free to weathervane or rotate around tubular 100. Fairing nose 121 may be connected to tail piece 131 by internal blocks (as shown in FIG. 1). The internal blocks may be attached to tail piece 131 by any suitable means, and to fairing nose 121 by block fasteners 138. Similarly, fairing nose 122 may be connected to tail piece 132 by internal blocks which are attached to tail piece 132 by any suitable means and to fairing nose 122 by block fasteners 137. In some embodiments, an anti-fouling structure such as a copper bar may be used to keep marine growth from forming on the inside of a fairing. In such embodiments, fairing 101 may further include copper fasteners 139, which are used to attach a piece of copper to the inside of fairing 101. Although not shown, it should be understood that fairing 102 may further include a copper bar attached to fairing 102 by fasteners, similar to fairing 101.

Still referring to FIG. 1, fairings 101 and 102 may be of any suitable size or shape. Fairing noses 121 and 122 may be of any suitable size or shape. For example, fairing noses 121 and 122 may be tapered or U-shaped. Tail pieces 131 and 132 may be flat sheets or may be triangular, Y-shaped, or of any other suitable shape. Fairing noses 121 and 122 may be of a single piece or may be made of multiple pieces. Similarly, tail pieces 131 and 132 may be of a single piece or may be made of multiple pieces. Any number of block fasteners 137 or 138 may be used, or may not be used at all, if methods other than fastening are used to attach the internal blocks to fairings 101 or 102. Similarly, copper fasteners 139 are optional and any number may be present. Collars 110, 111, and 112 may be of any suitable size or shape and may be made of any number of sections, pieces or components. Representatively, in one embodiment, collars 110, 111 and 112 may be cylindrical members which completely encircle tubular 100, and have a height less than that of fairings 101 and 102, as shown. Any number of collars 110, 111 and 112 may be present. For example, multiple fairings 101 and 102 may be used adjacent to a single collar, without any other collars between them.

Still referring to FIG. 1, fairing noses 121 and 122, tail pieces 131 and 132, block fasteners 137 and 138, copper fasteners 139, and collars 110, 111, and 112 may be made of any suitable material including, but not limited to, metal, plastic, fiberglass or other composite, synthetic, wood, or elastomer. Materials may be mixed or matched in any desired manner.

Figure 2:
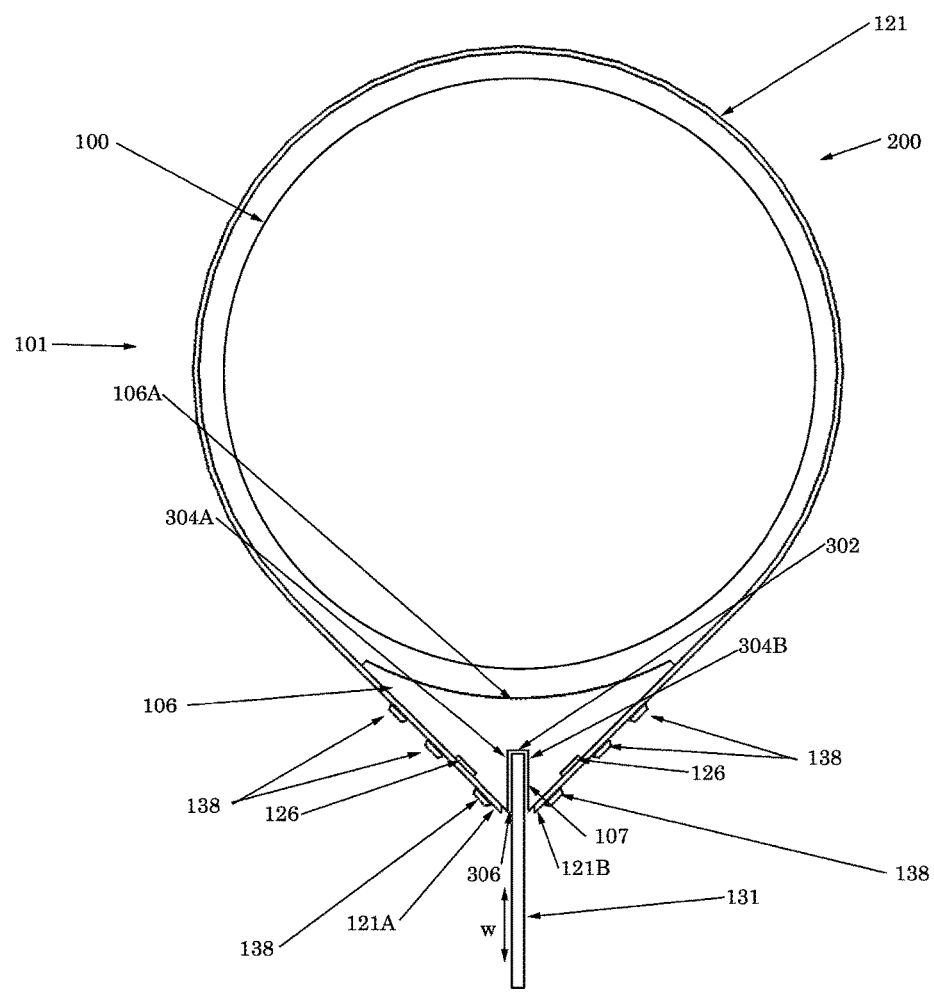
FIG. 2 is a top view of a fairing with a block and a separate tail piece.

Referring now to FIG. 2, FIG. 2 illustrates a top view of one embodiment of a VIV suppression system 200. The main components of VIV suppression system 200 are fairing 101 including fairing nose 121, internal block 106, and tail piece 131. Fairing nose 121 may be considered an encircling member in that it can encircle all or a portion of tubular 100. In particular, as can be seen from this view, fairing nose 121 is one continuous piece including a first end or side 121A that extends toward a second end or side 121B when the nose 121 is positioned around tubular 100. Representatively, first side 121A may extend toward second side 121B such that they form a tapered or triangular shaped opening or channel along tubular 100. It is contemplated, however, that in some embodiments, fairing nose 121 could be formed by multiple pieces, which when combined, encircle tubular 100 as shown.

Block 106 may be positioned between the first and second sides 121A, 121B of nose 121, and encircles less than an entire circumference of tubular 100. Tail piece 131 may be inserted into channel 107 in internal block 106, as shown. In some embodiments, the combination of block 106 and tail piece 131 may be referred to herein as a tail unit, tail assembly or tail system. Block 106 may, in one embodiment, have a tapered or triangular shape so that it fits within the opening formed between sides 121A, 121B of nose 121 and tubular 100, as previously discussed. For example, block 106 may have a curved base portion 106A dimensioned to rest along tubular 100, and encircle less than an entire circumference of the tubular 100, and then the remainder of block 106 tapers inwardly in a direction away from tubular 100 to form the triangular shape. In one embodiment, block 106 is attached to sides 121A, 121B of fairing nose 121 by block fasteners 138. Although block 106 is shown attached to both sides 121A, 121B of fairing nose 121, it is contemplated that in some embodiments, block 106 may be attached to only one of sides 121A, 121B of nose 121. Grooves 126 may further be formed in block 106, between block 106 and an inner surface of end portions of nose 121. Grooves 126 may be axially extending (e.g. extending parallel to an axis of tubular 100) regions which are recesses formed into the outer surface of block 106. Grooves 126 may be dimensioned to house copper pieces or any other anti-fouling member or internal appurtenances.

Again referring to FIG. 2, fairing 101 is free to rotate around tubular 100. Internal block 106 acts as a bearing surface for fairing 101 against tubular 100. In addition, block 106 provides structural support to the sides of fairing nose 121 (e.g., sides 121A, 121B) so that the nose does not experience excessive deformation or structural stress.

Tail piece 131 is shown inserted into channel 107 of block 106 such that it extends radially outward from tubular 100. For example, tail piece 131 may be considered to have a width dimension (w) and a length or height dimension (h), the width dimension (w) being the dimension extending radially outward from tubular 100, and the height dimension (h) being the dimension running in an axial direction, parallel to the axis of tubular 100. The width dimension (w) may be less than the height dimension (h) such that tail piece 131 is considered to have an elongated, or substantially rectangular shape. In some embodiments, tail piece 131 is a planar or plate like member which is substantially flat or straight along its entire length (l) and height (h). Said another way, tail piece 131 has a planar surface on both sides.

Channel 107 is dimensioned to receive and support tail piece 131 along tubular 100. In this aspect, in some embodiments, channel 107 may be a recessed region formed inwardly from an exterior surface of block 106, and having a size and shape complimentary to that of tail piece 131. Representatively, where block 106 has a substantially triangular profile (or shape) as shown, channel 107 may be formed inwardly from the apex of block 106. In this aspect, when tail piece 131 is inserted into channel 107, the width dimension (w) of tail piece 131 extends radially outward from the surface of tubular 100. Said another way, the planar surface of tail piece 131 is substantially perpendicular to a line tangential to a surface of tubular 100.

For example, in some embodiments, channel 107 may be a rectangular recess having a base portion 302 and side walls 304a, 304b. Side walls 304a, 304b may be parallel to one another, and extend inwardly from an opening 306 along the exterior surface of block 106 to base portion 302, such that they are perpendicular to base portion 302. Channel 107 therefore has a closed end (formed by base portion 302) and an open end to the exterior surface of block 106, and the opening 306 may be formed between the ends 121A, 121B of nose 121. Side walls 304a, 304b may be spaced a distance apart by base portion 302 so that tail piece 131 can fit therein. Said another way, base portion 302 may have a width dimension that is substantially the same as, slightly larger than, or larger than the thickness of tail piece 131. In this aspect, when tail piece 131 is inserted into channel 107, its opposing exterior surfaces may rest against side walls 304a, 304b, respectively, such that it is secured within the channel by friction or an interference fit. In some cases, channel 107 may have a same height (i.e. the dimension running parallel to tubular 100) as tail piece 131 and/or block 106. In other embodiments, channel 107 may have a different height than tail piece 131 and/or block 106, for example, may be shorter than the height of tail piece 131 and/or block 106. In some embodiments, tail piece 131, upon insertion into channel 107, is not attached to fairing 101 or block 106 using a fastener, but rather is held in place by an interference fit. In other embodiments, tail piece 131 may be attached to internal block 106 or fairing nose 121 (or both) by any suitable means including, but not limited to, fastening, riveting, chemical bonding, welding, clamping, pinning, or by other intermediate structures. In addition, in some embodiments, tail piece 131 and block 106 may be molded together.

Still referring to FIG. 2, internal block 106 may be attached to fairing nose 121 by any suitable means including, but not limited to, fastening, riveting, chemical bonding, welding, clamping, pinning, an interference fit, or by other intermediate structures. Internal block 106 may be made of any suitable material including, but not limited to, metal, plastic, fiberglass or other composite, synthetic, wood, or elastomer. Grooves 126 may be of any suitable size or shape and may extend through part of internal block 106 or through all of internal block 106. Any number of grooves 106 may be present. It is also recognized that other means of mitigating marine growth may be utilized in conjunction with, or in place of, copper pieces such as coatings on any part of fairing 101. It is also recognized that grooves 126 and any anti-fouling mitigation is entirely optional and it is possible for tubular 100 to have some fairings with marine growth mitigation and some fairings without marine growth mitigation.

Figure 3:
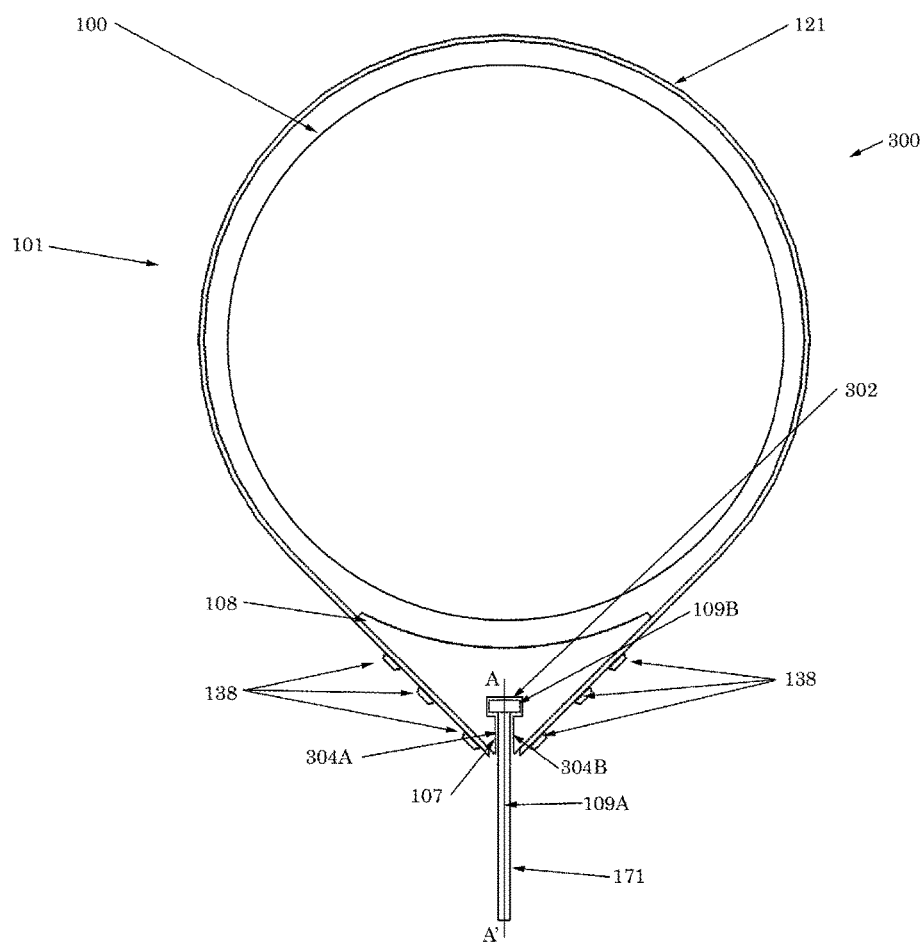
FIG. 3 is a top view of a fairing with a block having a channel and mating tail piece.

Referring now to FIG. 3, FIG. 3 illustrates another embodiment of a VIV suppression system 300 including fairing 101 on tubular 100. Fairing 101 has fairing nose 121, internal block 108, and tail piece 171. Internal block 108 is attached to fairing nose 121 using block fasteners 138, which can extend through fairing nose 121 and into block 108. Similar to FIG. 2, block 108 has a channel 107, and tail piece 171 is inserted into channel. In this embodiment, however, tail piece 171 has a substantially flat, straight portion 109A, and an out-of-plane portion formed by, for example, a cross-piece 109B attached at its end. The cross-piece 109B may also be a flat or planar member, however, is positioned normal or perpendicular to the end of the straight portion 109A so that it extends out of the plane of the straight portion, and forms an angle of approximately 90 degrees with respect to the straight portion. Both the straight portion 109A and cross-piece 109B of tail piece 171 are inserted into channel 107, as shown. In this aspect, channel 107 may have sidewalls 304a, 304b similar to those previously discussed, except that they form a complimentary T-shaped recess region with base portion 302 at their ends. Said another way, the closed end, or base portion 302, of channel 107 forms a pocket at the end of sidewalls 304a, 304b, which corresponds to the size and shape of cross-piece 109B so that cross-piece 109B can be inserted therein and restrained from moving.

Again referring to FIG. 3, by use of cross-piece 109B, tail piece 171 is restrained from sliding out the tail part of internal block 108. Said another way, positioning of the cross-piece 109B in the closed end of channel 107 as described herein restrains the tail piece 171 from one or more directions of movement, or degrees of freedom (e.g., moving up/down, left/right, forward/backard, yawing, pitching or rolling). Any number of cross-pieces 109B may be used and cross-piece 109B may be of any suitable geometry and may consist of any number of components. In general, cross piece 109B may have a shape that restricts it from easily sliding out of internal block 108 during operation of fairing 101. Cross piece 109B may extend in any suitable direction and thus there may be one cross-piece 109B that restricts movement of tail piece 171 in one direction and another cross-piece 109B that restricts movement of tail piece 171 in another direction. Like cross-piece 109B, internal block 108 may also be of any suitable size or shape and may consist of more than one component with its components attached or connected to each other by any suitable means.

Still referring to FIG. 3, cross-piece 109B and internal block 108 may be made of any suitable material including, but not limited to, metal, plastic, fiberglass or other composite, synthetic, wood, or elastomer.

Figure 4:
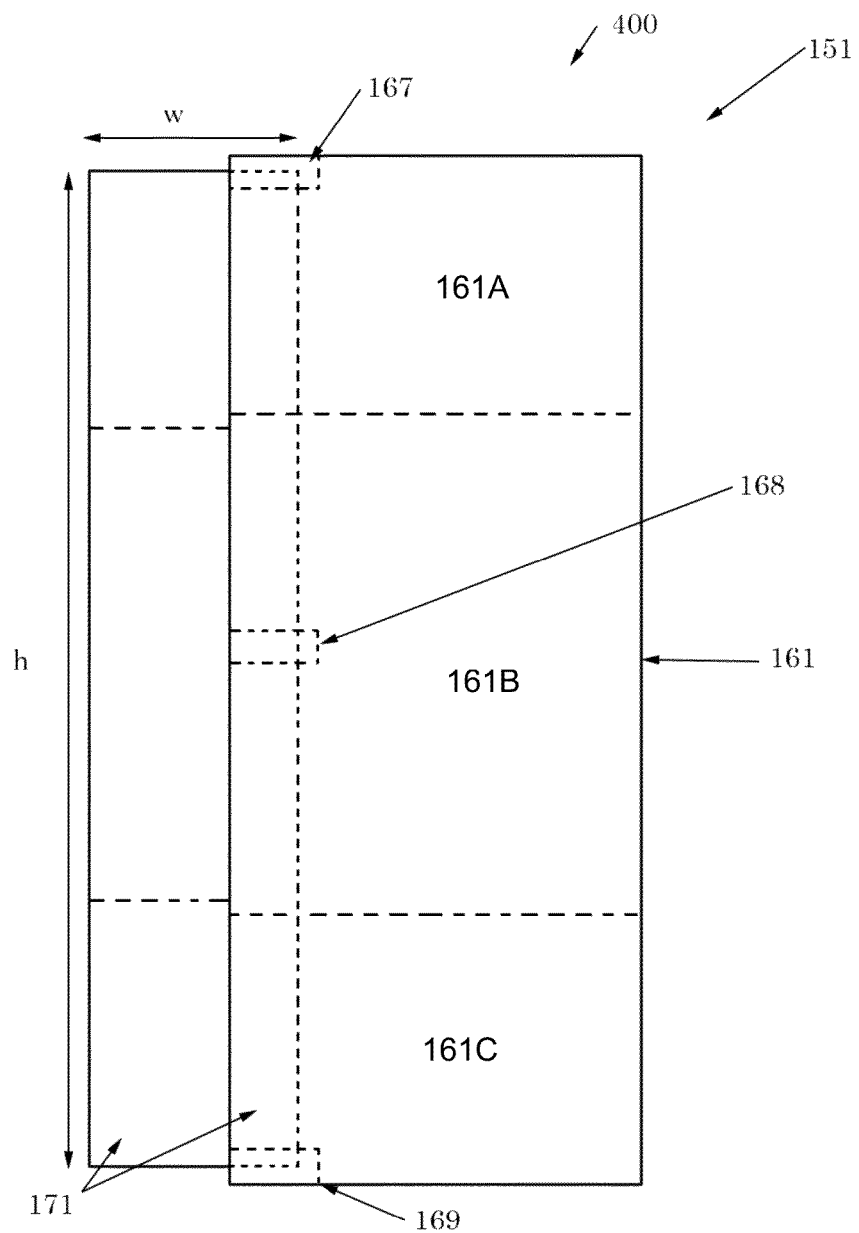
FIG. 4 is a side view of a fairing with blocks and a separate tail piece.

Referring now to FIG. 4, FIG. 4 illustrates a side view of a fairing system 400. Fairing system 400 includes fairing 151 having fairing nose 161, end blocks 167, 169, center block 168, and tail piece 171. Fairing 151 may be similar to fairing 101, as previously discussed in reference to FIG. 1-FIG. 3. End blocks 167, 169 and center block 168 are along the interior surface of fairing nose 161, and are therefore illustrated by dashed lines, as is the portion of tail piece 171 positioned within blocks 167-169.

Again referring to FIG. 4, FIG. 4 illustrates how multiple blocks, for example end blocks 167, 169 and center block 168, may be utilized to vertically restrain tail piece 171. End blocks 167, 169 may have an opening or groove for tail piece 171 that extends only partially into the block, while center block 168 has an opening or groove that allows tail piece 171 to completely pass through it. In addition, as can be seen from FIG. 4, a height of each of blocks 167-169 is less than the overall height of fairing nose 161, and tail piece 171. In other words, blocks 167-169 are separate structures which are spaced apart along the height nose 161 and tail piece 171 such that they occupy only a relatively small portion of the height of nose 161 and tail piece 171.

Still referring to FIG. 4, fairing 151, fairing nose 161, tail piece 171, end blocks 167, 169, and center block 168 may consist of a single component or may consist of more than one component and may be of any suitable size, shape, quantity, or material. For example, in some embodiments, fairing 151 may be in sections or segments so that, for example, it includes multiple relatively short nose pieces 161A, 161B, 161C (as illustrated by dashed lines) that can be positioned one on top of the other along the tubular to form fairing 151 having the desired height or length, as shown in FIG. 4. In this embodiment, each nose piece 161A-C may have its own block and tail piece 171 ties all the pieces together. Still further, fairing 151 may include a single nose piece 161A-161B and multiple relatively short or segmented tail pieces 171 (as illustrated by dashed lines), and each block 167-169 may have its own tail piece. The nose pieces 161A-161B and/or blocks can then be used to hold the tail piece segments together.

Figure 5:
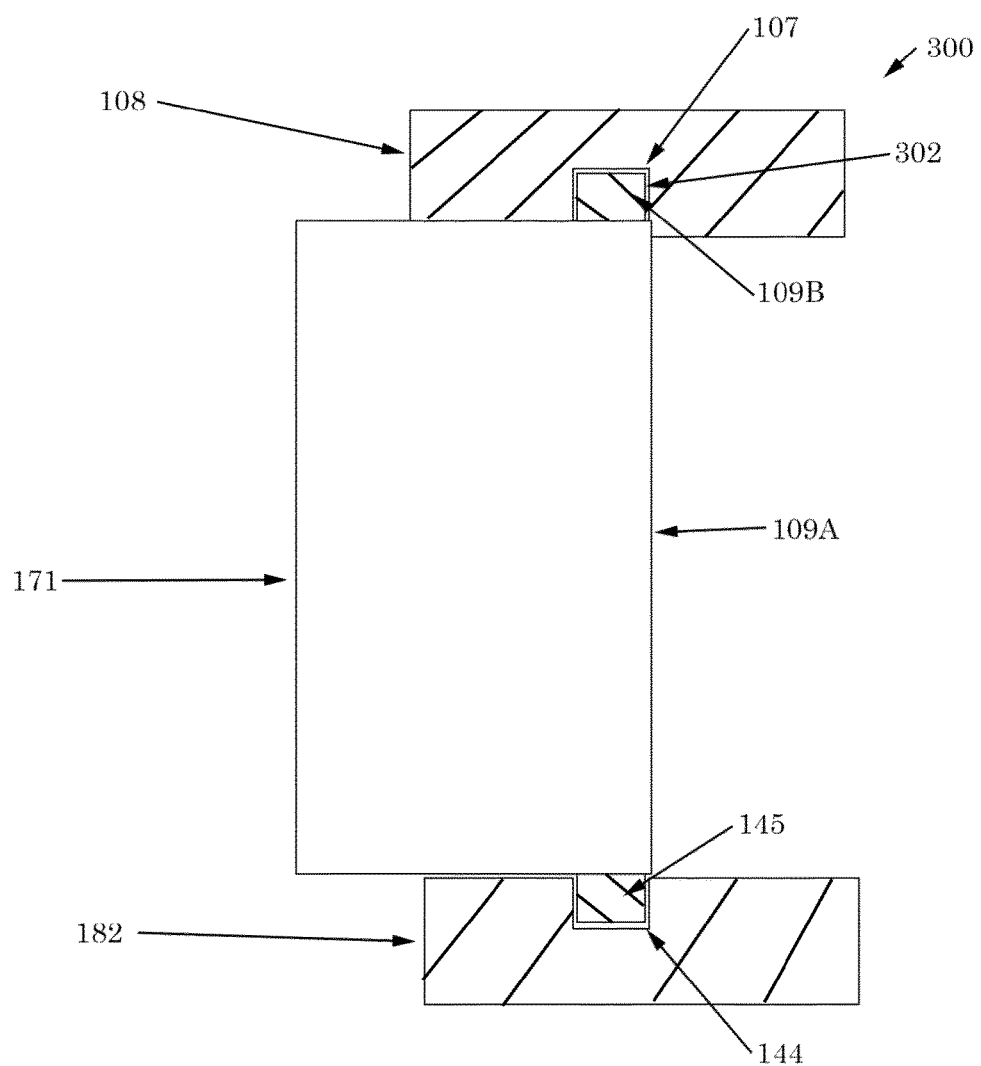
FIG. 5 is a cross section view of a tail piece and two blocks.

Referring now to FIG. 5, FIG. 5 illustrates a cross sectional view along line A-A' of FIG. 3 and shows two adjacent internal blocks 108 and 182 adjacent to tail piece 171. Tail piece 171 has cross-piece 109B which extends into channel 107 of internal block 108, as previously discussed. In addition, from this view, it can be seen that the opposing end of tail piece 171 may also include a cross-piece 145 which extends into channel 144 of internal block 182. Internal block 182, cross-piece 145 and channel 144 may be substantially similar to block 108, cross-piece 109B and channel 107, previously discussed in reference to FIG. 5. Alternatively, cross-piece 145 may be a tab, or any other type of protruding member suitable for holding the planar portion 109A of tail piece 171 within channel 144 of block 182. In some cases, cross-piece 145 may protrude in only the vertical direction as shown, as opposed to making a T-shaped structure, as illustrated in FIG. 3.

Again referring to FIG. 5, FIG. 5 illustrates one method of constraining tail piece 171 using blocks 108, 182 adjacent to the ends of tail piece 171. In FIG. 5, it can be seen that portions of both the planar portion 109A and cross-piece 109B at the top end of tail piece 171 extend vertically into internal block 108 (through channel 107 as shown in FIG. 3). The bottom end of the planar portion 109A, however, does not extend into channel 144 of the bottom block 182. Rather, in this embodiment, only the cross-piece 145 at the bottom end extends into block 182. In other embodiments, however, the bottom end of planar portion 109A of tail piece may also extend vertically into block 182, similar to the top end. FIG. 3 therefore illustrates how tail piece 171 is restrained from coming out the back of an internal block 108, while FIG. 5 illustrates how tail piece 171 is restrained from coming out of internal blocks 108 and 182 vertically. In general, FIG. 5 illustrates one of many methods for restraining tail piece 171. It is worth noting that the method for restraining tail piece 171 presented in FIG. 5 does not use fasteners but fasteners can be used if desired. Other methods may also be used to restrain tail piece 171 as noted above.

Still referring to FIG. 5, internal block 182 and cross-piece 145 may be of any suitable size, shape, or geometry and any number of internal blocks and cross-piece 145 may be utilized. Internal block 182 and cross-piece 145 may consist of more than one component and may be made of any suitable material.

Figure 6:
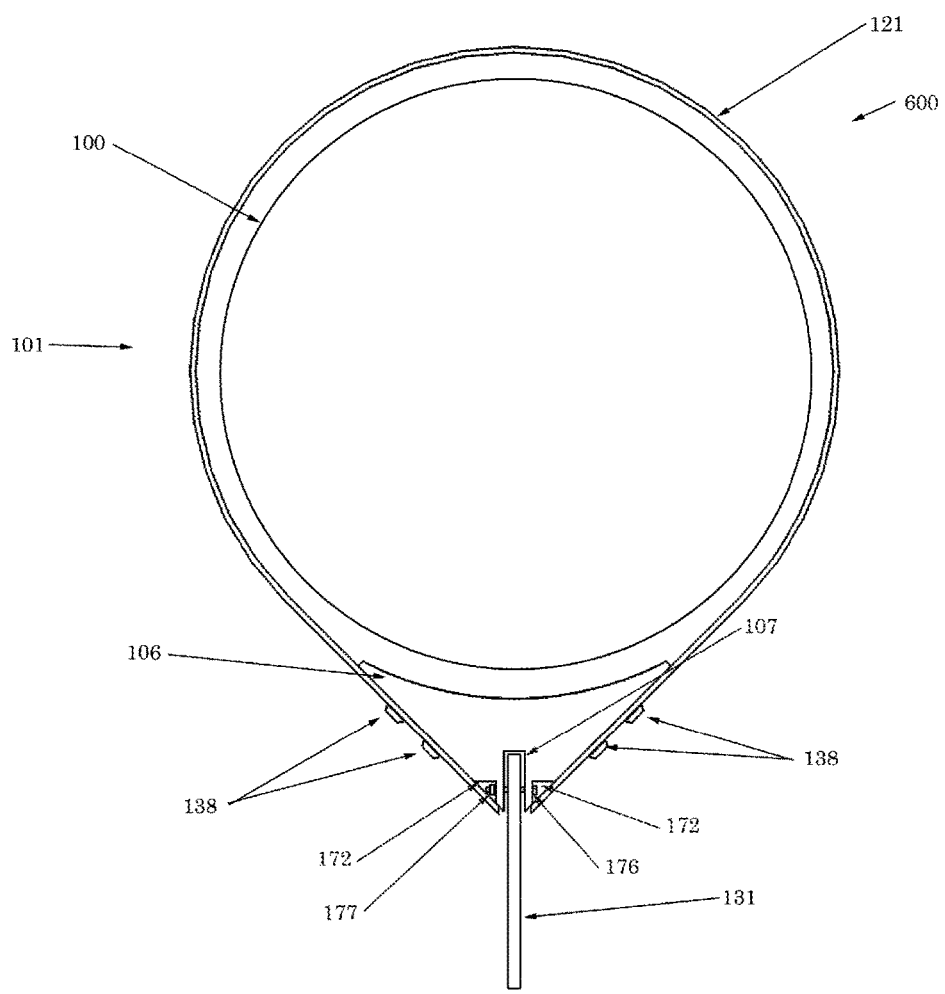
FIG. 6 is a top view of a fairing with a block having openings for fastening.

Referring now to FIG. 6, FIG. 6 illustrates a top view of a VIV suppression system 600 including a fairing 101 on tubular 100. The main components of fairing 101 are fairing nose 121, internal block 106, and tail piece 131 which is inserted into channel 107 in internal block 106, as previously discussed in reference to FIG. 2. Internal block 106 is attached to fairing nose 121 by block fasteners 138. Block 106 may further include pockets 172 formed therein, near the apex of block 106 and opposing sides of channel 107. Pockets 172 may be dimensioned receive piece bolt, which runs entirely through internal block 106 and tail piece 131 in a widthwise direction, and is secured by tail piece nut 177, in the other pocket 172.

Again referring to FIG. 6, this figure differs from FIG. 2 in that pockets 172 provide an easy way to secure tail piece 131 to internal block 106 by using tail piece bolt 176 and tail piece nut 177. Any number of pockets 172 may be present and pockets 172 may extend from the edge of internal block 106 or may be completely internal to block 106. Pockets 172 may be of any suitable size or shape. Internal block 176 may have other features or indentations to accommodate a fastening member, an anti-fouling member, or a strengthening member. Tail piece bolt 176 and tail piece nut 177 may be made of any suitable material and other fastener types or fastener mechanism may be used in place of, or in conjunction with, tail piece bolt 176 and tail piece nut 177. Any quantity of tail piece bolt 176 and tail piece nut 177 may be used to secure tail piece 131 to internal block 106.

Figure 7:
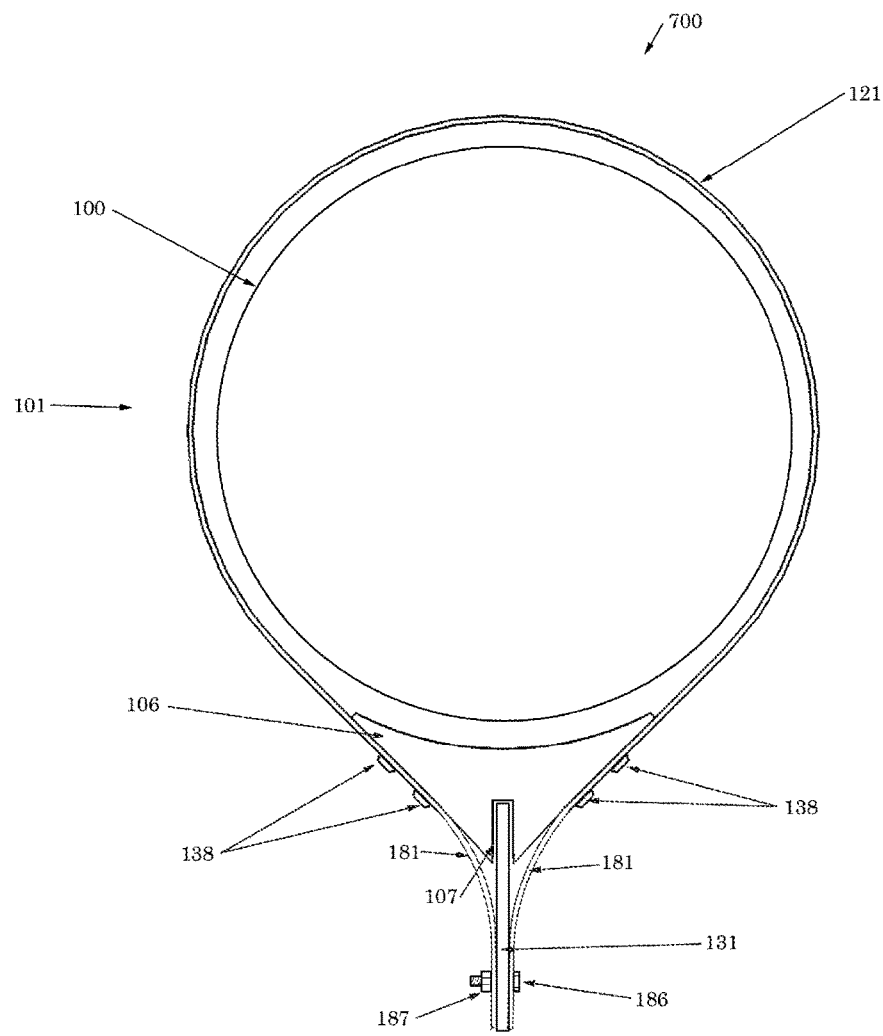
FIG. 7 is a top view of a fairing with curved sides and a fastened tail piece.

Referring now to FIG. 7, FIG. 7 illustrates a top view of a VIV suppression system 700 including a fairing 101 on tubular 100. The main components of fairing 101 are fairing nose 121, internal block 106, and tail piece 131 which is inserted into channel 107 in internal block 106. Internal block 106 is attached to fairing nose 121 by block fasteners 138. In this embodiment, fairing nose 121 has curved sides 181 which extend along opposing sides of tail piece 131, all the way to the end of tail piece 131. In some embodiments, however, sides 181 may stop short of the end of tail piece 131. In some embodiments, sides 181 may be secured directly to tail piece 131 by tail bolt 186 and tail nut 187.

Again referring to FIG. 7, FIG. 7 illustrates how a tail piece having curved sides can be created along opposing sides of tail piece 131 by curved sides 181. In addition, FIG. 7 illustrates a tail piece 131 which is attached to sides 181 by a bolt 186 inserted through the sides and tail in a widthwise direction, but not block 106. The combination of sides 181 and tail piece 131 can be used, in addition to creating a curved tail, increase an overall thickness of the tail portion. Tail piece 131, however, is optional since opposite curved sides 181 can be secured directly to each other using tail bolt 186 and tail nut 187, or by any other suitable means. Tail piece 131 can also optionally be secured to internal block 106 by any suitable means. While fairing nose 121 has curved sides 181 near tail piece 131, fairing nose 121 could instead have straight sides, or bent sides to produce a shape similar to tail piece 131, thereby making tail piece 131 optional.

In some embodiments, fairing nose 121 can be cold-formed, that is it can be formed without heat. In general, curved sides 181 may have any suitable shape and may be curved outwards away from the fairing or inwards towards the fairing as they are in FIG. 7. Curved sides 181 may be integral to fairing nose 121 or may be made of any number of separate pieces or components and secured to fairing nose 121, internal block 106, or tail piece 131, or any combination thereof, using any suitable means.

Still referring to FIG. 7, internal block 106 may optionally extend further along tail piece 131 or may be truncated further away from tail piece 131. Since tail piece 131 is secured to curved sides 181 and therefore fairing nose 121 using tail bolt 186 and tail nut 187, tail piece 131 does not have to be directly secured to internal block 106 and thus channel 107 is optional.

Still referring to FIG. 7, tail bolt 186, tail nut 187, and curved sides 181 may be made of any suitable material and may be made of the same material or different materials. Other suitable means for securing curved sides 181 to each other or to tail piece 131 may be used.

Figure 8:
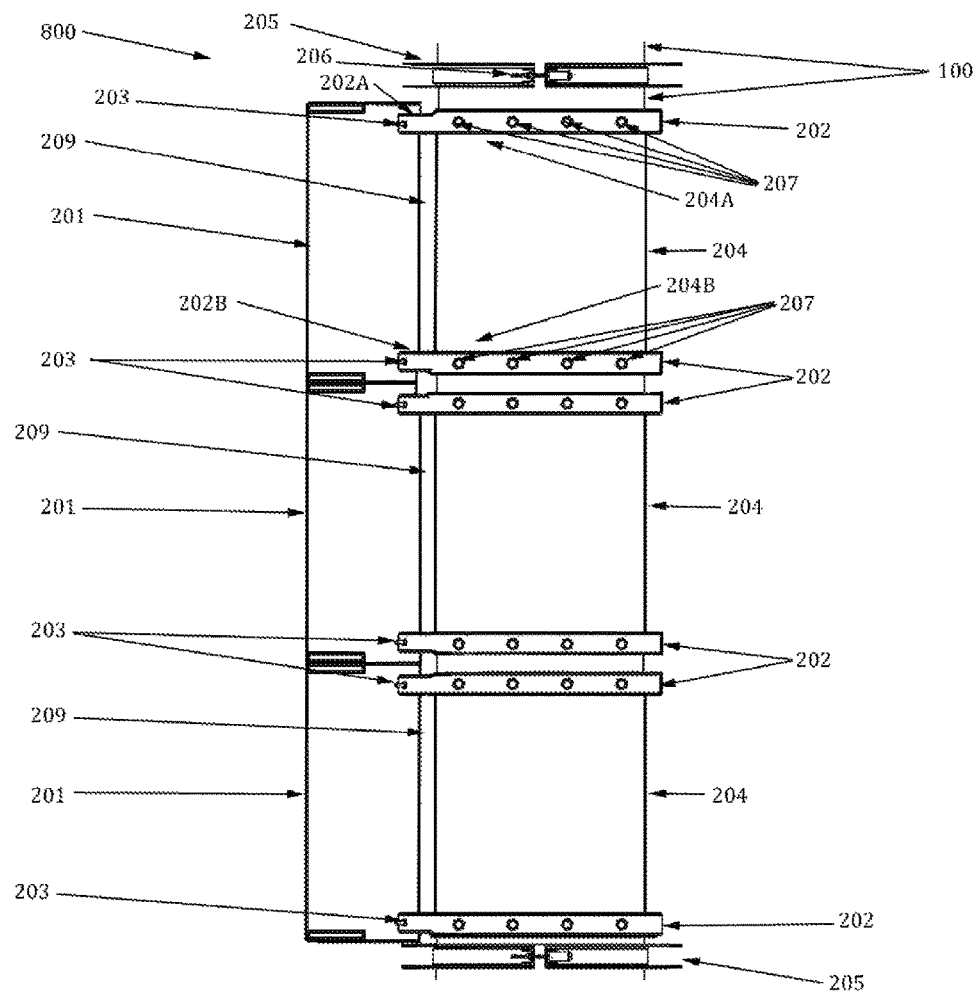
FIG. 8 is a side view of a pipe with multiple fairings and collars with a shroud mounted to the inside of the straps.

FIG. 8 shows fairings 800 having tails or tail pieces 201 held onto tubular 100 by straps 202 which are attached at their ends 202A, 202B to tails 201 using tail fasteners 203. Fairings 800 further include shrouds 204, which are sleeve like members that wrap around tubular 100, similar to fairing nose 121 previously discussed in reference to FIG. 1. Shrouds 204 extend along the tubular length between the straps 202 of each fairing. Shrouds 204 may therefore have a similar shape as fairing nose 121, however, are attached at their top end 204A and/or bottom end 204B to the inside of straps 202 by strap fasteners 207, and then straps 202 are used to secure shrouds 204 to the tubular 100. In other words, instead of being held to tubular 100 by fastening their interfacing ends or sides together, or to an interior block, as discussed with respect to nose 121, they may be held in place solely by attaching the top and/or bottom edges to straps 202. In addition, in some embodiments, there may be an annulus 209 (or gap) between the straps 202 or the tails 201 and tubular 100, such that tails 201 are spaced apart from tubular 100. Collars 205 are adjacent to tails 201 and straps 202 to prevent them from sliding past collars 205. Collar fasteners 206 hold collars 205 tight against tubular 100.

Again referring to FIG. 8, any number of tails 201, straps 202, and shrouds 204 may be used between two adjacent collars 205. Any number of tail fasteners 203 may be used to attach straps 202 to tails 201 and tails 201 may be attached to straps 202 in any number of locations. Any number of straps 202 may be used for tails 201. Various types of tail fasteners 203 may be used, including more than one type on a single tail 201 or strap 202. Tail fasteners 203 may consist of any suitable fastener, fastener component, or fastener mechanism including, but not limited to, bolts, screws, nuts, washers, pins (including lynch pins), clamps, hinges (or hinge type structures or systems), rings, adhesive or other chemical bonding, and welding.

Shrouds 204 may be made up of a single piece or may be made of multiple pieces. In addition, shroud 204 may be dimensioned to cover a substantial portion of the area bounded by straps 202 and tails 201. Unlike a typical full fairing system in which the tail is integrally formed with, or is otherwise one continuous piece with, the fairing body and/or nose, shrouds 204 may be separated from tails 201 by annulus 209. In this aspect, the only connection between shrouds 204 and tails 201 is via straps 202. Any number of strap fasteners 207 may be used to attach shrouds 204 to straps 202. Any suitable fastener, fastener component, of fastener mechanism may be used including, but not limited to, bolts, screws, nuts, washers, pins (including lynch pins), clamps, rings, adhesive or other chemical bonding, and welding. Shrouds 204 may also be molded with straps 202 so that they are a single part. Collars 205 may include any suitable collar that is capable of being clamped tight against tubular 100. Collars 205 may include any number of circumferential sections that are fastened together by any suitable means. In general, since tail fairings are fast to install, by including shrouds 204 between straps 202 and potentially pre-installing one side of straps 202 to tails 201, the fairing system is fast to install since it installs much like a tail fairing.

Still referring to FIG. 8, tails 201, straps 202, shrouds 204, and collars 205 may have any suitable shape though. In some cases, straps 202 extend no more than 12-16 inches along the longitudinal axis of tubular 100 and extend 6-8 inches along the longitudinal axis of tubular 100. Shrouds 204 may take on the shape of the inside face (adjacent to tubular 100) of straps 202 or may be attached to one or more external faces of straps 202. Straps 202 and shrouds 204 may be split at the fairing nose and may be hinged or assembled at the nose (so that the entire fairing opens at the nose). Tails 201, straps 202, and shrouds 204 may be of any suitable shape to form any suitably shaped fairing including, but not limited to, teardrop shaped, U-shaped, and shapes with curved sides.

Still referring to FIG. 8, tails 201, straps 202, shrouds 204, and collars 205 may be made of any suitable material including, but not limited to, plastic, metal, wood, fiberglass or composite, synthetic, and any combination of materials.

Figure 9:
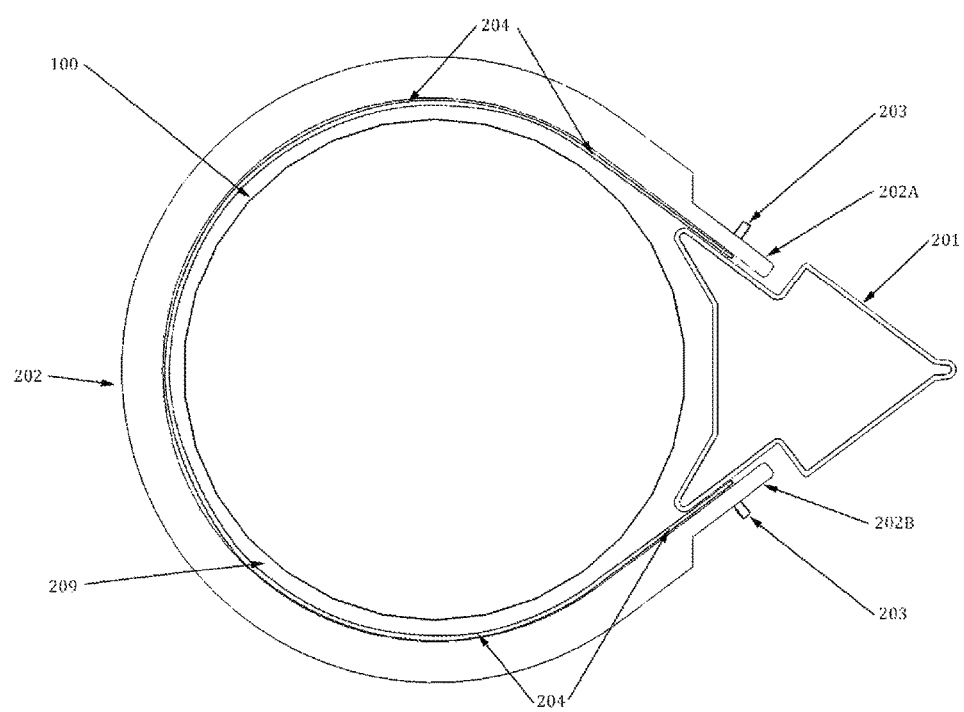
FIG. 9 is a top view of a pipe with a tail, strap, and shroud.

Referring now to FIG. 9, in FIG. 9 is a top view of a shrouded fairing similar to fairing 800. From this view, it can be seen that strap 202 is attached to tail 201 by tail fasteners 203. Shroud 204 is attached to the inside of strap 202 and annulus 209 is formed as the area between shroud 204 and tubular 100.

Again referring to FIG. 9, shroud 204 may be mated to strap 202 by any suitable means, and some means may leave small gaps between shroud 204 and strap 202. It is also recognized that spacers may be utilized between strap 202 and shroud 204 so as to change the inside diameter of shroud 204 and thereby change annulus 209 or allow strap 202 to accommodate a range of diameters of tubular 100. Spacers or inserts may also be used to assist with proper mating of shroud 204 with tail 201 so that the flow past shroud 204 and tail 201 is controlled to improve the effectiveness of the present invention. Such spacers, or inserts, may consist of any suitable structure including, but not limited to, washers, tubes, pipe, rods, nuts, or other appurtenances. Such spacers or inserts may be held in place by any suitable mechanism and may be made of any suitable material. In general, by utilizing spacers as needed, shroud 204 may be able to fit straps coming from an existing strap mold and reduce the need for additional tooling and its associated cost.

Still referring to FIG. 9, shroud 204 is shown to be adjacent to tail 201 at its attachment point by tail fasteners 203. However, it is also possible to have shroud 204 terminate just before reaching tail 201, as previously discussed in reference to FIG. 8. It is also possible to use various spacers between shroud 204 and strap 202 to control how shroud 204 lines up with tail 201 to maximize the overall fairing performance or for any other reasons such as insuring easy fairing rotation around tubular 100. Shroud 204 may, or may not, extend to tail fasteners 203 and may (or may not) have openings or appurtenances to facilitate installation of the fairing system. Shroud 204 may also have ribs, lapping, connecting structures, or other structures to connect multiple pieces of shroud 204.

Figure 10:
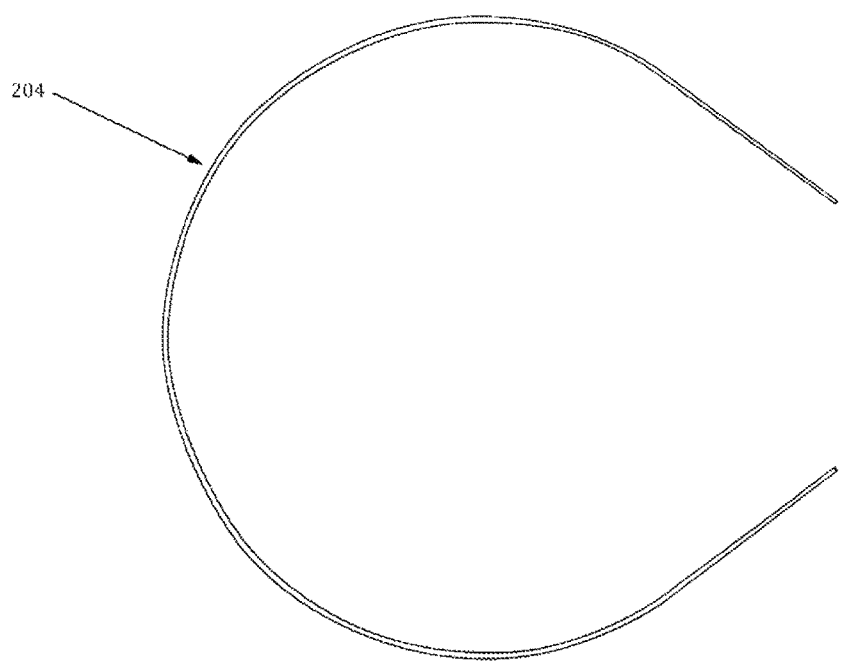
FIG. 10 is a top view of a shroud.

Referring now to FIG. 10, FIG. 10 illustrates only shroud 204, as previously discussed in reference to FIG. 8 and FIG. 9. As noted previously, shroud 204 may be of any suitable shape. It may also stop short of the tail or be present adjacent to the sides of the tail for any suitable distance. In addition, shroud 204 may have holes or other openings as desired (e.g. for cathodic protection of the coating on the underlying pipe). In addition, as can be seen from this view, shroud 204 is not a complete circle, rather it includes ends with a gap in between. Shroud 204 therefore does not completely encircle, or otherwise completely enclose, the underlying tubular. Rather, it is only once tail 201 is connected to shroud 204 by straps 202, that the fairing is dimensioned to completely encircle the tubular 100.

Figure 11:
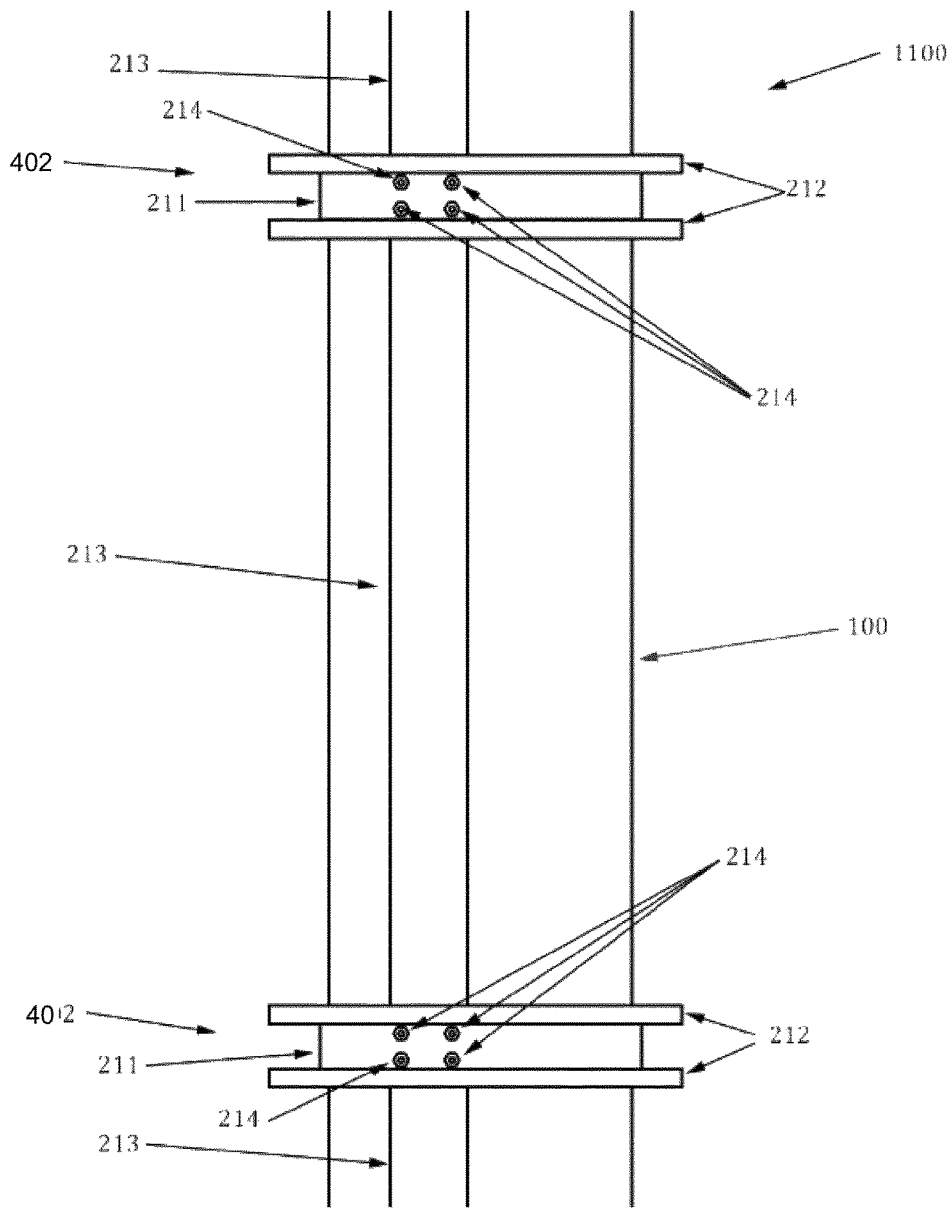
FIG. 11 is a side view of two collars and an auxiliary line cover running between the collars.

Referring now to FIG. 11, FIG. 11 is a side view of a VIV suppression system 1100 including collars 402 positioned around tubular 100. Each collar 402 may have web 211 (which extends vertically along tubular 100) and flanges 212 (which extend radially outward from web 211. Auxiliary line covers 213 run between collars 402 and are attached to collars 402 using fasteners 214. In some embodiments, covers 213 may be attached such that they are positioned along the interior surface of collars 402.

Again referring to FIG. 11, FIG. 11 illustrates a system including auxiliary line covers 213 configured to cover auxiliary lines that are external to tubular 100 to protect the lines or improve the fairing performance. Auxiliary line covers 213 run the full length between collars 402 and therefore completely cover the auxiliary lines underneath them. Any number of auxiliary line covers 213 may be used and they do not have to run the entire distance between adjacent collars. Auxiliary line covers 213 may be held in place at only one end (i.e. by only one collar 402) or at both ends as shown. Any number of auxiliary line covers 213 may be used around the circumference of tubular 100 as it is common to have auxiliary lines that are approximately 180 degrees apart around the circumference of tubular 100. Collars 402 are shown having web 211 and flanges 212 with flanges 212 normally used as a bearing surface for the adjacent tails or straps (or for the shrouds should the shrouds extend past the straps). Any suitable geometry for collar 402 may be used and the collar does not need to completely surround the circumference of tubular 100. Collar 402 may have any number of sections around the circumference of tubular 100 or along the longitudinal axis of tubular 100 (or both) and collar 402 may be clamped tight against tubular 100 using any suitable means including, but not limited to, bands, bolts, nuts, chemical bonding, or the use of a spring mechanism to keep collar 402 closed around tubular 100 (or any combination thereof). Auxiliary line covers 213 may be attached to collars 402 using any suitable method.

Still referring to FIG. 11, any number of collars 402 may be used adjacent to auxiliary line covers 213 and other collar or clamping mechanisms may be substituted for collars 402. For example, spring cord, elastic cord, rope, bands, cable ties, or bungee cords (or any suitable structure or method)

may be used along auxiliary line covers 213 or at one end of auxiliary line covers 213 to keep them tight against tubular 100.

Still referring to FIG. 11, auxiliary line covers 213 may be made of any suitable material including, but not limited to, plastic, metal, wood, fiberglass or composite, synthetic, and any combination of materials.

Figure 12:
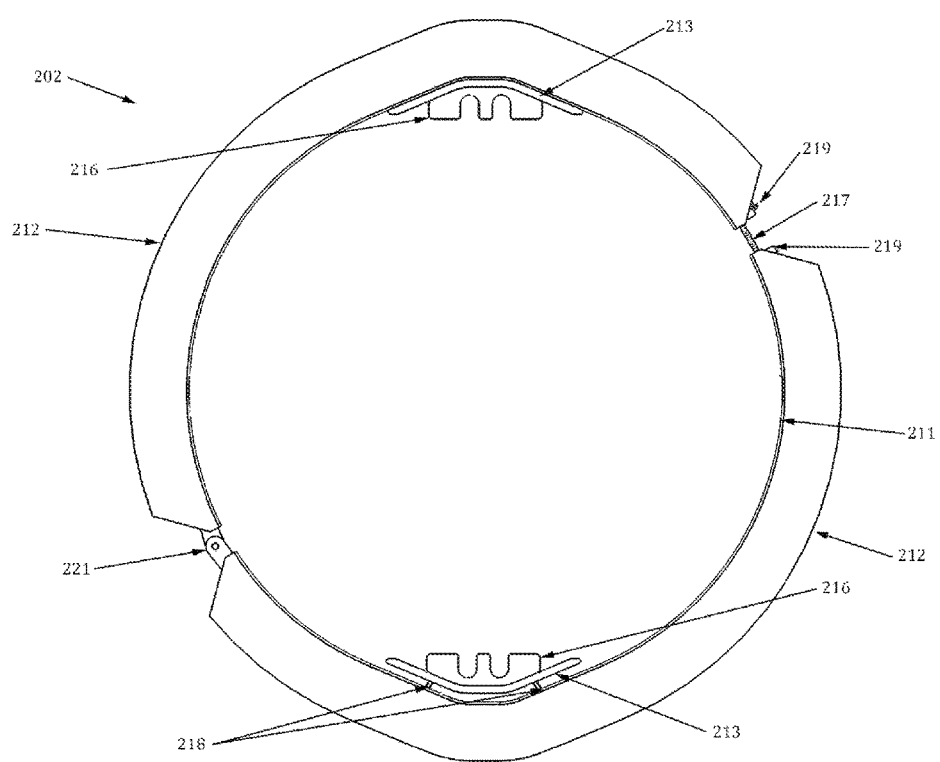
FIG. 12 is a top view of a collar with auxiliary line covers and auxiliary line inserts.

Referring now to FIG. 12, FIG. 12 illustrates a cross-sectional top view of a collar 402 having flange 212 made up of two circumferential halves that are attached at one end using collar hinge 221 and at the other end using bolt 217 that pushes bolt plates 219 together. Auxiliary line covers 213 are attached to the inside face of collar 402 and auxiliary line inserts 216 are attached to auxiliary line covers 213. One auxiliary line cover 213 is spaced off of collar 402 using spacers 218.

Again referring to FIG. 12, auxiliary line inserts 216 are meant to house the auxiliary lines and keep those lines in place once collar 402 and auxiliary line inserts 216 are tightened against an underlying pipe. Auxiliary line covers 213 also act to guide the fairing tail around the auxiliary line inserts 216 so that the fairing can change its orientation with changes in current direction (i.e. the fairing is free to rotate).

Still referring to FIG. 12, auxiliary line inserts 216, auxiliary line covers 213, and spacers 218 (which are completely optional) may be of any suitable size, shape, or quantity. Auxiliary line inserts 216 are optional in that it is possible to contain auxiliary lines simply using auxiliary line covers 213 (which are also optional) alone or by simply using the shape of collar 402. Auxiliary line inserts 216 and auxiliary line covers 213 may be attached to collar 402 by any suitable means and auxiliary line inserts 216 may be attached to auxiliary line covers 213 and not directly attached to collar 402 or auxiliary line inserts 216 may be directly attached to collar 402. Any suitable structure may be used for spacers 218 including, but not limited to, bolts, nuts, washers, tubing, pipe, or other appurtenances which may be molded into, chemically bonded, or fastened to collar 402, auxiliary line inserts 216, or auxiliary line covers 213 (or by any other suitable means).

Still referring to FIG. 12, auxiliary line inserts 216 and spacers 218 may be made of any suitable material including, but not limited to, plastic, metal, fiberglass or other composite, synthetic, wood, or any combination thereof.

Figure 13:
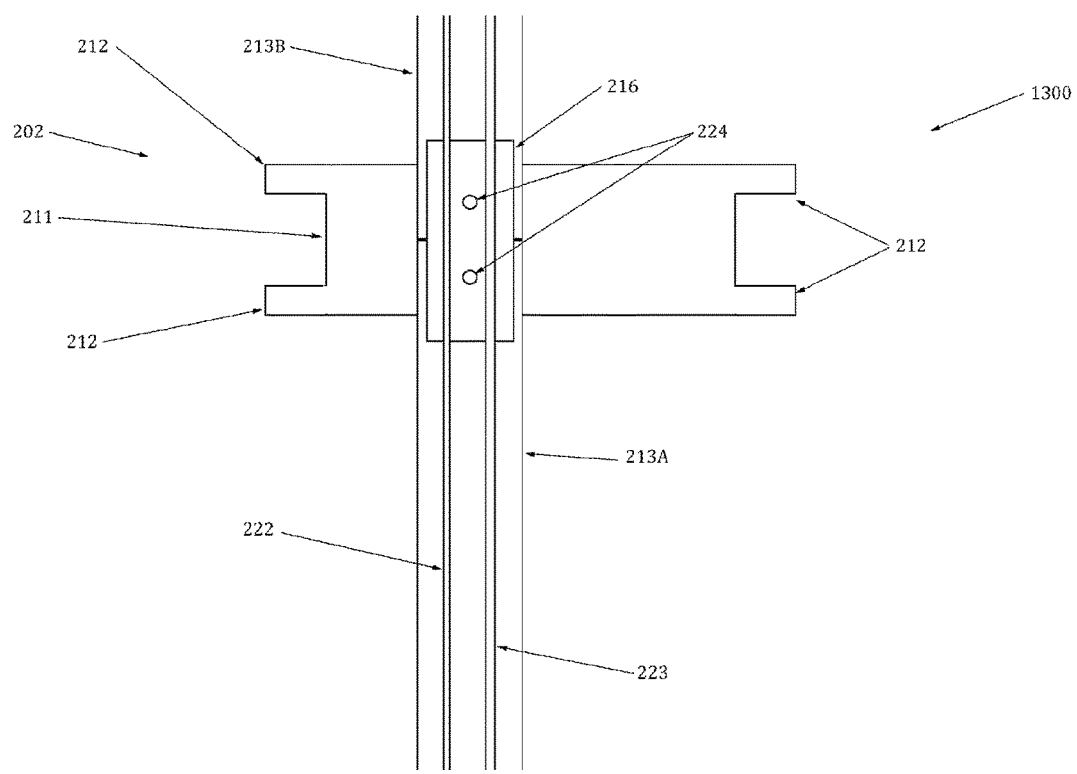
FIG. 13 is a side view of the inside of a collar half with auxiliary line covers, an auxiliary line insert, and auxiliary lines.

Referring now to FIG. 13, FIG. 13 illustrates a side plan view of a VIV suppression system 1300 including auxiliary line covers 213A and 213B and auxiliary line insert 216 attached to collar 402 using cover fasteners 224. Collar 402 contains web 211 and flanges 212. Small auxiliary line 222 and large auxiliary line 223 are contained by auxiliary line insert 216.

Again referring to FIG. 13, auxiliary line covers 213A and 213B are both attached to collar 402 at one of their ends and usually (but optionally) attached to an adjacent collar at their other end. However, it is possible for a single auxiliary line cover to be attached to collar 402 and have any desired height along the tubular axis. Similarly auxiliary line insert 216 may have any desired height and may, or may not, be taller than collar 402 along the pipe axis. Auxiliary line insert 216 may be made to contain any number of auxiliary lines and may contain auxiliary lines of any suitable diameter.

The above aspects of this invention may be mixed and matched in any manner suitable to achieve the purposes of this invention. It is recognized that, various components may be mixed and matched and that anti-fouling materials or coatings may be attached to all or part of the components. It is also recognized that the overall fairing shape may be of any suitable shape.

The above aspects of this invention may be mixed and matched in any manner suitable to achieve the purposes of this invention. Other appurtenances for connecting various components may be utilized and each component may be manufactured by any suitable means. In particular, a fairing nose piece may be pre-formed to a desired shape using heat or other means or may be formed during final assembly of the fairing. For example, the fairing nose piece may consist of a sheet of material that is bent into shape and attached to one or more internal blocks or to a tail piece. An internal pipe may, or may not, be used to bend the fairing nose piece into the desired shape. While most of this invention utilizes a fairing nose that does not require heat for construction or formation, heat may be used on the fairing nose when needed and heat may be used on the other fairing components as desired.

In broad embodiment, the present invention consists of a fairing nose that is attached to one or more internal blocks or support structures and a tail piece. In addition, in some embodiments, the fairing is in sections so that, for example, it includes multiple relatively short nose pieces that can be positioned one on top of the other along the tubular to form a fairing having the desired height or length, as shown in the drawings. In this embodiment, each nose piece may have its own block and a that tail piece ties all the pieces together. Still further, the fairing may include a single nose piece and multiple tail pieces, and each block may have its own tail piece. In addition, the fairing nose or fairing outer body may optionally be formed without heat (i.e. cold formed). In addition, although the nose or outer body is described as being cold formed, it is contemplated that any aspects or parts of the fairing of VIV systems disclosed herein (e.g. a collar, a tail, or the like) may be cold formed.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For several of the ideas presented herein, one or more of the parts may be optional. The invention should therefore not be limited by the above described embodiment, method, and examples, but by all embodiments and methods within the scope and spirit of the invention.

What is claimed is:

1. A fairing for suppressing a vortex induced vibration (VIV) of a tubular, the fairing comprising:
   an encircling member dimensioned to encircle a tubular, the encircling member having a first side that extends toward a second side when the encircling member is positioned around the tubular;
   a support member positioned between the first side and the second side, the support member having a channel formed therein, the channel being defined by a base, a pair of side walls that are parallel to one another, perpendicular to the base, and extend radially outward from the base to an opening to the channel that is positioned between the first side and the second side; and
   a tail member positioned within the channel, the tail member having a substantially planar surface that extends radially outward from the channel.

2. The fairing of claim 1 wherein the entire tail member is planar.

3. The fairing of claim 1 wherein a first portion of the tail member is planar and a second portion of the tail member is out-of-plane with respect to the first portion.

4. The fairing of claim 3 wherein a closed end of the channel is dimensioned to receive the second portion, and positioning of the second portion in the closed end restrains the tail member from one or more degrees of freedom.

5. The fairing of claim 1 wherein the tail member is attached to the support member by a fastener extending entirely through the support member and the tail piece in a widthwise direction.

6. The fairing of claim 1 wherein the tail member is attached to the first side and the second side of the encircling member by a fastener inserted through only the tail member and the first side and the second side of the encircling member.

7. The fairing of claim 6 wherein the first side and the second side are curved inwardly toward the tail member.

8. The fairing of claim 1 wherein the support member runs substantially an entire height of the tail member.

9. The fairing of claim 1 wherein the support member and the tail member are molded together.

10. The fairing of claim 1 wherein the encircling member is a fairing nose, and the fairing nose is made up of a plurality of nose piece segments stacked one on top of another, and which are secured together by the tail member extending between each of the nose pieces.

11. The fairing of claim 1 wherein the tail member is made up of a plurality of tail piece segments stacked one on top of another, and held together by the encircling member or the support member.

12. A fairing for suppressing a vortex induced vibration (VIV) of a tubular, the fairing comprising:
    a tail assembly dimensioned to suppress a vortex induced vibration of a tubular, the tail assembly having a support member that encircles less than an entire circumference of the tubular and has a channel formed therein, the channel being defined by a base, a pair of side walls that are parallel to one another, perpendicular to the base, and extend radially outward from the base to an opening, and a tail member having a first portion positioned within the channel and a second planar portion extending outward from the channel opening; and
    a fairing nose dimensioned to encircle a remaining circumference of the tubular and secure the tail assembly to the tubular.

13. The fairing of claim 12 wherein the tail assembly and the fairing nose are separate pieces attached to one another by fasteners.

14. The fairing of claim 12 wherein the fairing nose is formed without heat.

* * * * *